United States Patent
Chen

(10) Patent No.: US 6,847,804 B2
(45) Date of Patent: Jan. 25, 2005

(54) APPARATUS AND METHOD FOR TESTING MICROPOWER SHORT-WAVE FREQUENCY-MODULATED DIGITAL RADIO

(75) Inventor: Peter Chen, Taipei (TW)

(73) Assignee: Key Mouse Electronic Enterprise Co., Ltd., Taipei (TW)

(*) Notice: Subject to any disclaimer, the term of this patent is extended or adjusted under 35 U.S.C. 154(b) by 503 days.

(21) Appl. No.: 10/076,274

(22) Filed: Feb. 19, 2002

(65) Prior Publication Data

US 2003/0158613 A1 Aug. 21, 2003

(51) Int. Cl.$^7$ ............................................. H04B 17/00
(52) U.S. Cl. ................................................ 455/67.14
(58) Field of Search ..................... 455/1, 63.1, 67.12, 455/41.2, 39, 67.11, 67.14, 67.15; 375/224; 324/118, 135

(56) References Cited

U.S. PATENT DOCUMENTS 6,675,000 B1 * 1/2004 Ichikawa ................. 455/127.3

2002/0163962 A1 * 11/2002 Al-Eidan ................... 375/240

* cited by examiner

*Primary Examiner*—Lee Nguyen
*Assistant Examiner*—Sanh Phu

(57) ABSTRACT

A method for testing micropower short-wave frequency-modulation digital radio includes the steps of providing at each test station on a production line with a steel cage that is adapted to accommodate a transmitter and a corresponding receiver for test; and providing between two steel cages located at two adjacent test stations with an interference generator that transmits signal-free carriers having the same frequency as that of electric waves transmitted from the transmitter to be tested. Electric waves outward radiated from a steel cage are first attenuated by the steel cage, then destructed by electric waves from the interference generator, and then attenuated again by a steel cage at another test station. Since the attenuated signal-free carriers are not decoded at the receiver in any other steel cage, radio tests could be simultaneously conducted at two adjacent test stations without being mutually interfered.

5 Claims, 7 Drawing Sheets

APPARATUS AND METHOD FOR TESTING MICROPOWER SHORT-WAVE FREQUENCY-MODULATED DIGITAL RADIO

BACKGROUND OF THE INVENTION

The present invention relates to a method for testing micropower short-wave frequency-modulated (FM) digital radio on a production line, in which two or more interference-prevented test stations are simultaneously provided on the production line and an interference generator is provided between two adjacent test stations, so that mutual interference between two adjacent test stations is completely prevented. The present invention also relates to apparatus for implementing the method of the present invention.

The prosperously developed electronic technologies have brought significant innovations to many appliances being used in our daily lives, leading us toward a radio world. In production of many micropower short-wave frequency-modulated (FM) digital radio-controlled products, a problem of mutual interference is frequently encountered during testing of half-finished and finished products. FIG. 1 shows a conventional method for testing these half-finished and finished products on a production line to avoid mutual interference. In this method, a predetermined quantity of half-finished products are assembled and collected at a first station A (step 1), the half-finished products are then sent to a first isolation chamber (step 2), that is a Faraday cage, to be tested one by one. The tested half-finished products are then sent back to the production line and conveyed to a second station B for assembling into finished products (step 3). The finished products are collected and tested again by sending them to another isolation chamber that is also a Faraday cage to be tested one by one (step 4). The tested finished products are then sent back to the production line for final packaging (step 5). During the whole process of production and test, the products to be tested are collected and conveyed four times to leave the production line twice and move into the isolation chambers twice, resulting in increased manufacturing time and low production efficiency. And, the products are subjected to potential damages in the process of conveyance. Moreover, the isolation chambers are built by employing the concept of electromagnetic shielding and include multiple layers of holed metal plates to obtain good electric wave isolation effect. However, such isolation chambers require very high manufacturing cost and are heavy and bulky to occupy additional spaces in a factory.

It is therefore tried by the inventor to develop apparatus and method for testing micropower short-wave FM digital radio on a production line to eliminate drawbacks existing in the conventional testing method.

SUMMARY OF THE INVENTION

A primary object of the present invention is to provide a method for testing micropower short-wave FM digital radio on a production line, in which two or more interference-prevented test stations are simultaneously provided on the production line and an interference generator is provided between two adjacent test stations, so that mutual interference between two adjacent test stations is completely prevented.

Another object of the present invention is provide a method for testing micropower short-wave FM digital radio on a production line, in which products to be tested are not necessarily moved from the production line to different positions for testing purpose, enabling largely reduced labor and time costs of the products.

A further object of the present invention is to provide a method for testing micropower short-wave FM digital radio on a production line, in which test apparatus employed to implement the method can be made at largely reduced cost and do not occupy additional space in a factory.

To achieve the above and other objects, the method for testing micropower short-wave FM digital radio on a production line according to the present invention includes the steps of providing at each test station on the production line with a steel cage that is adapted to accommodate a transmitter and a corresponding receiver for the same one product to be tested; and providing between two steel cages at two adjacent test stations with an interference generator that transmits signal-free carrier waves having the same frequency as that of carrier waves from the transmitters to be tested. Electric waves radiated from any one of the steel cages are attenuated by the steel cage and destructed due to interference by electric waves from the interference generator. When the destructed electric waves are transmitted to an adjacent test station, they are attenuated again by the steel cage at the adjacent test station before they arrive at the receiver in that adjacent steel cage and are finally superseded by electric waves in the adjacent steel cage. The attenuated and signal-free carrier waves are not decoded by receivers in the steel cages at other test stations. Thus, tests simultaneously conducted at two adjacent test stations on the production line are completely protected from mutual interference with one another.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
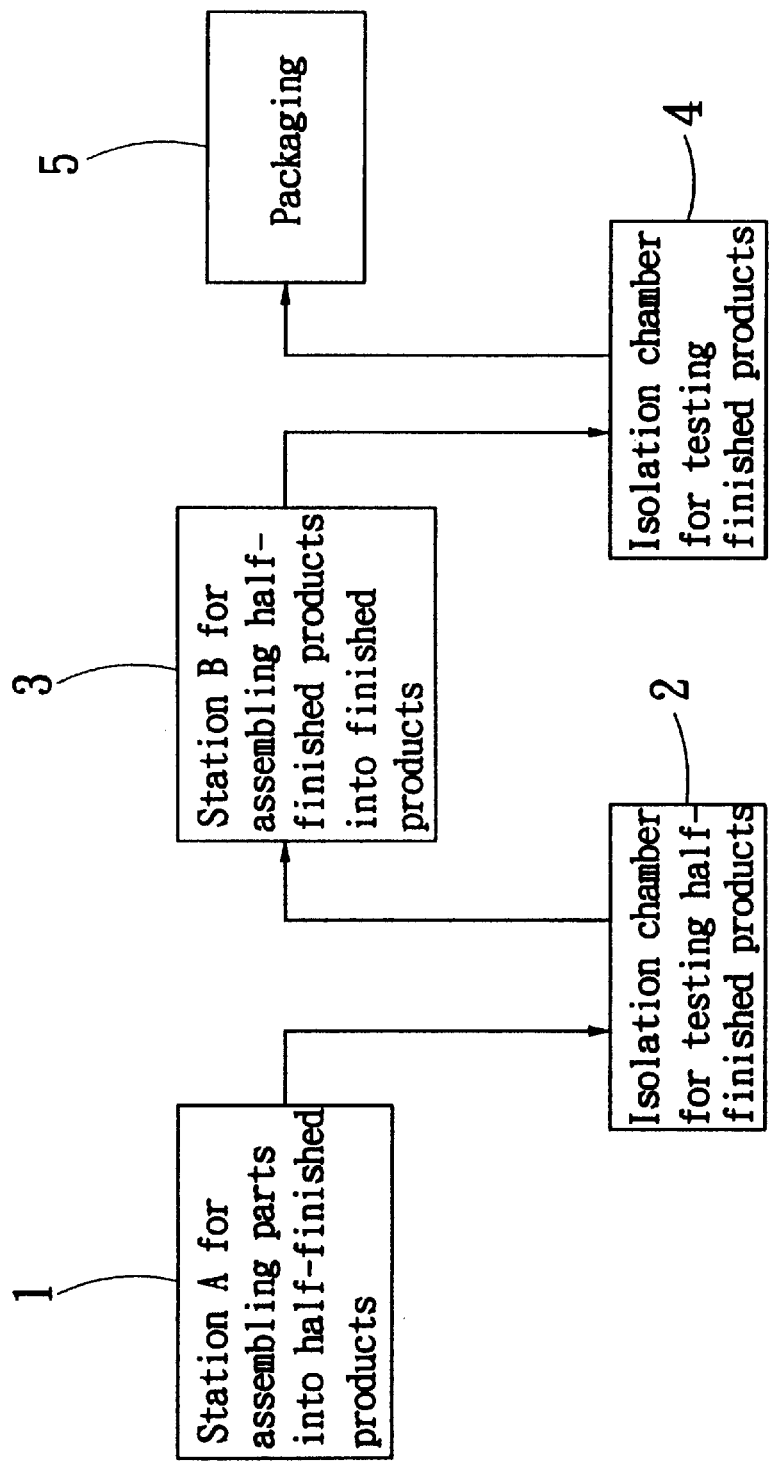
FIG. 1 is a flowchart showing steps of a conventional method for testing radio-controlled products on a production line.
Figure 2:
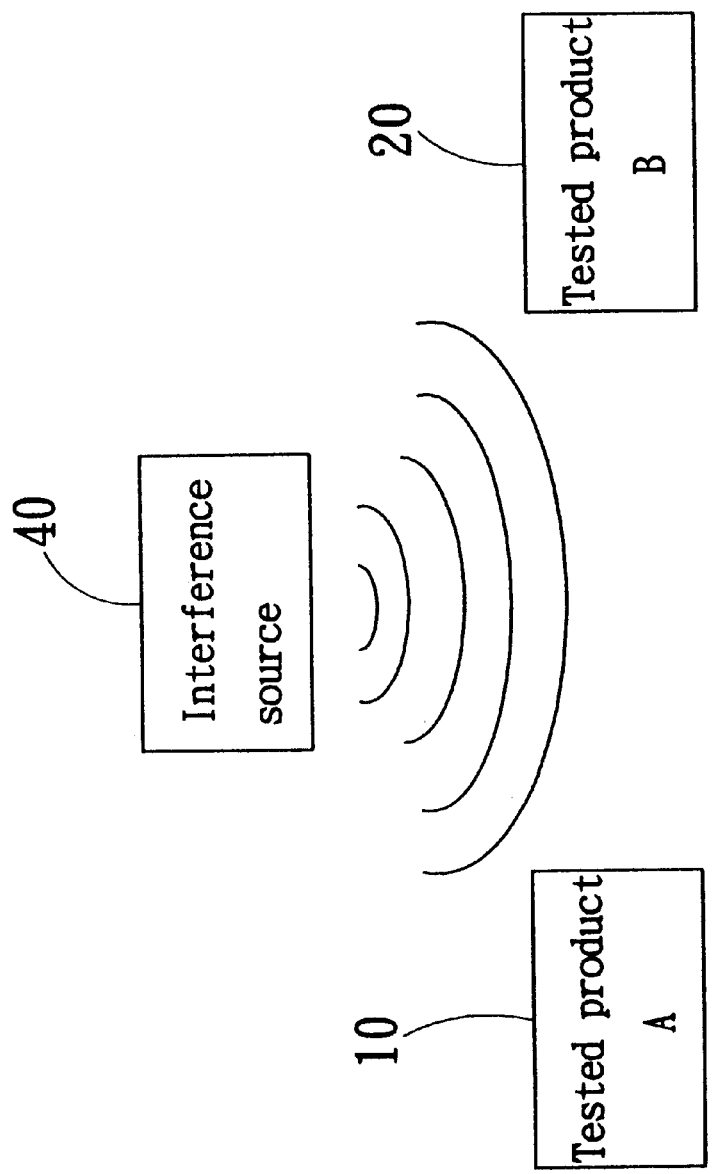
FIG. 2 schematically shows a foreign interference source is adopted in the present invention.
Figure 3:
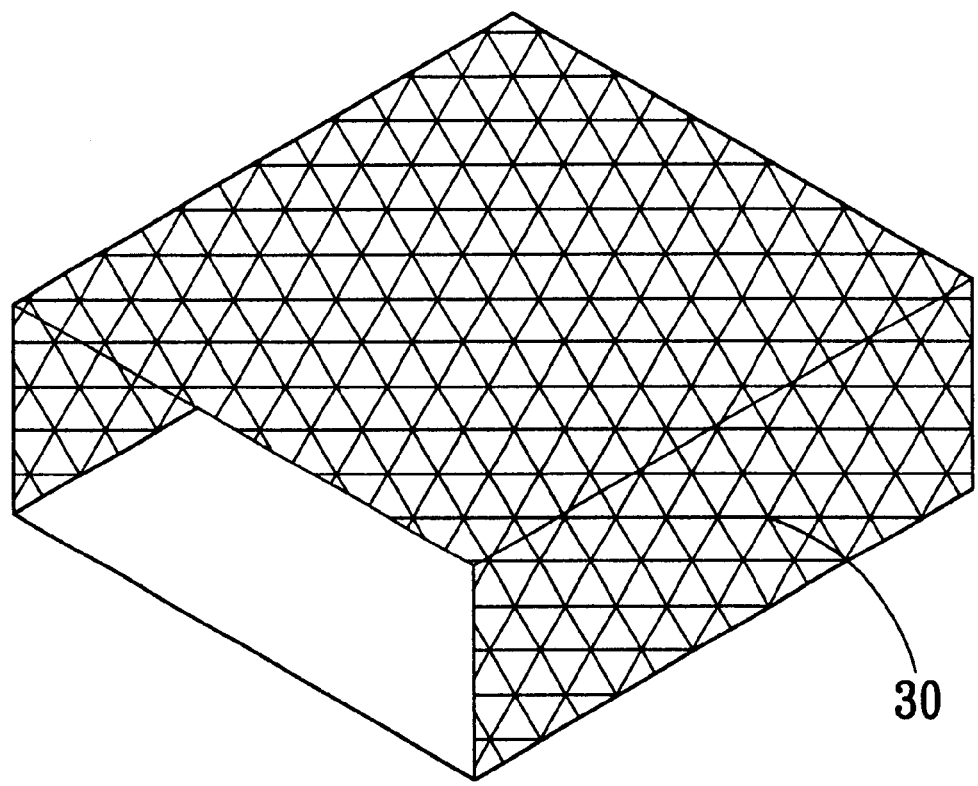
FIG. 3 is a perspective view of a steel cage adopted in the present invention as a test apparatus.

Please refer to FIG. 2. In the test method of the present invention, two products to be tested 10, 20 on a production line are separately positioned into two steel cages 30 shown in FIG. 3. The steel cage 30 is a cage made of steel wires capable of attenuating electric signals inside and outside the steel cage. Each steel cage 30 is located at a test station on the production line. A radio transmitter is provided between the steel cages 30 at two adjacent test stations to transmit signal-free carrier waves having a frequency the same as that of electric signals transmitted from the tested products 10 and 20, and thereby forms an interference source 40. The interference source 40 interferes with the electric waves transmitted from the two tested products 10, 20, so that the two tested products 10, 20 in the separated steel cages 30 are accurately and effectively tested.

Figure 7:
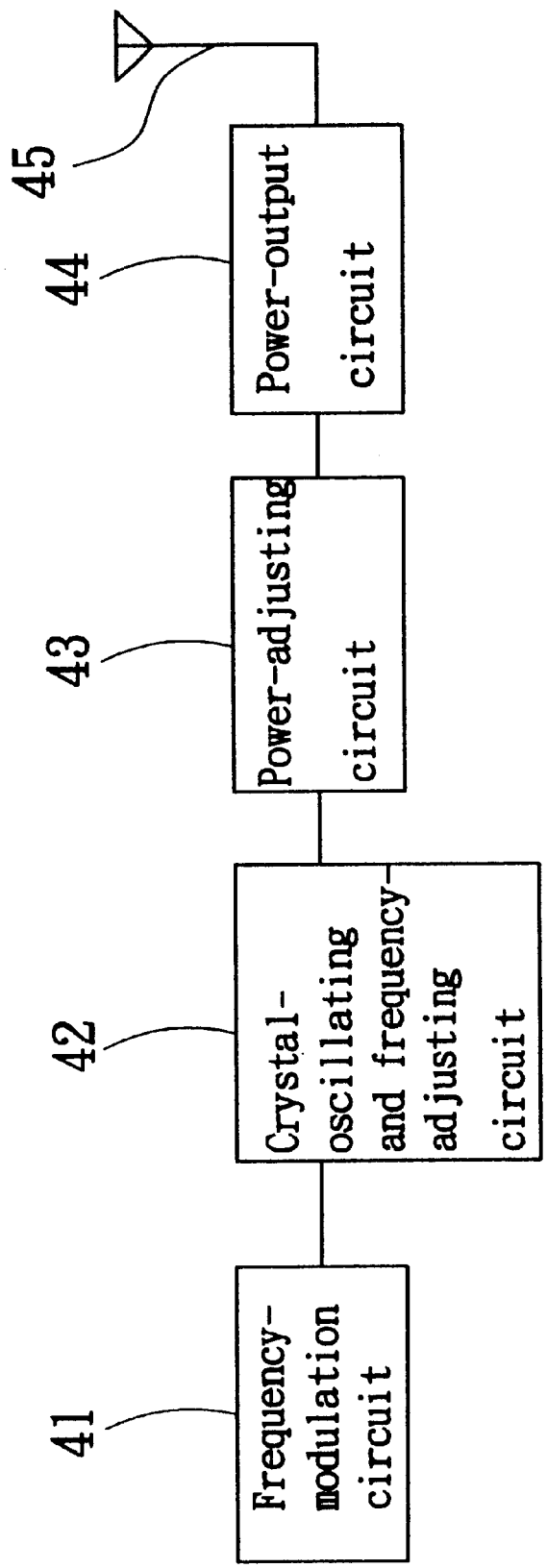
FIG. 7 is a block diagram showing circuits and FM modulation of an interference generator adopted in the present invention as a test apparatus.

The interference source 40 is an interference generator that together with the steel cages 30 form the apparatus of the present invention for testing micropower short-wave FM digital radio on a production line. FIG. 7 is a block diagram showing circuits and FM modulation of the interference generator 40. As shown, the interference generator 40 includes a frequency-modulation circuit 41, a crystal-oscillating and frequency-adjusting circuit 42, a power-adjusting circuit 43, a power-output circuit 44, and a transmission antenna 45.

The frequency-modulation circuit 41 modulates a radio frequency into a predetermined range and limits the crystal oscillating and frequency-adjusting circuit 42 to generate an oscillating frequency within the same predetermined range and to adjust and correct the oscillating frequency for the same to fall into a more accurate range of frequency. The power-adjusting circuit 43 determines an intensity of the oscillating frequency. Generally, a smaller power would have a relatively shorter radiation distance; and a larger power would have a relatively longer radiation distance. When the power has been adjusted to the desired intensity, the power-output circuit 44 sends out via the transmitting antenna 45 signal-free carrier waves having frequency the same as that of the electric waves transmitted from the tested product.

By allowing the interference generator 40 to transmit signal-free carrier waves having intensity higher than that of equifrequent signal-carrying carrier waves, the interference generator 40 is able to produce destructive interference with the electric waves transmitted from the tested products, so that the destructed electric waves originated from a tested transmitter in a steel cage 30 are not decoded by a receiver on a tested product in another steel cage 30. On the other hand, by allowing a transmitter on the tested product positioned in the steel cage 30 to transmit signal-carrying carrier waves having intensity higher than that of equifrequent signal-free carrier waves transmitted from the interference generator 40, signal-carrying carrier waves inside each steel cage 30 are not interfered by the interference generator 40 and could be decoded by a receiver on the same one tested product in the steel cage 30.

With the above-described arrangements, the interference generator 40 is caused to continuously transmit signal-free carrier waves. The interference generator 40 generally has a transmission power lower than that of the transmitter on each tested product to avoid interfering with the receiver of the same tested product. When the signal-carrying carrier waves from the transmitter on each tested product are transmitted to a location beyond a reception range of the receiver on the same tested product, they would become attenuated when they arrive at a receiver on a tested product in an adjacent steel cage 30 due to its small power and short radiation distance. At this point, the power of the signal-free carrier waves radiated from the interference generator 40 between the two steel cages 30 would become larger than that of the attenuated signal-carrying carrier waves. Due to being equifrequent, the signal-free carrier waves having larger power would supersede the signal-carrying carrier waves having smaller power. In this manner, the electric waves radiated from a transmitter on a tested product in one steel cage 30 are prevented from being received and decoded by a receiver on a tested product in another steel cage 30. Thus, many equifrequent radio-controlled products could be simultaneously tested in a common space at close positions without being interfered with one another. Moreover, in the case the signal-carrying carrier waves transmitted from the transmitter on the tested product are digital signals and the signal-free carrier waves transmitted from the interference generator are frequency-modulated signals, and the digital signals and the frequency-modulated signals are equifrequent and the frequency-modulated signals have intensity larger than that of the digital signals, it would be impossible to effectively decode the digital frequency-modulated signals at a receiver on another tested product.

The method of the present invention employs the principle of foreign interference of electromagnetic radiation and features of short wave. By foreign interference, it means an interference source that is not generated from a product being tested. For the tested product 10, both the tested product 20 and the interference source 40 are foreign interferences, and the interference source 40 is provided to destruct the electric waves transmitted from the tested product 10. On the other hand, for the tested product 20, the interference source 40 is provided to destruct the electric waves transmitted from the tested product 10.

The above-mentioned short wave refers to a radio wave having a wavelength within the range from 10 meters to 75 meters, and a frequency bandwidth within the range from 4 MHz to 30 MHz. The short wave has a metal-penetrating power inferior than that of ultra-short wave and extremely short wave that have even shorter wavelength, but superior than that of long wave, medium wave, and medium short wave that have even longer wavelength.

Figure 4:
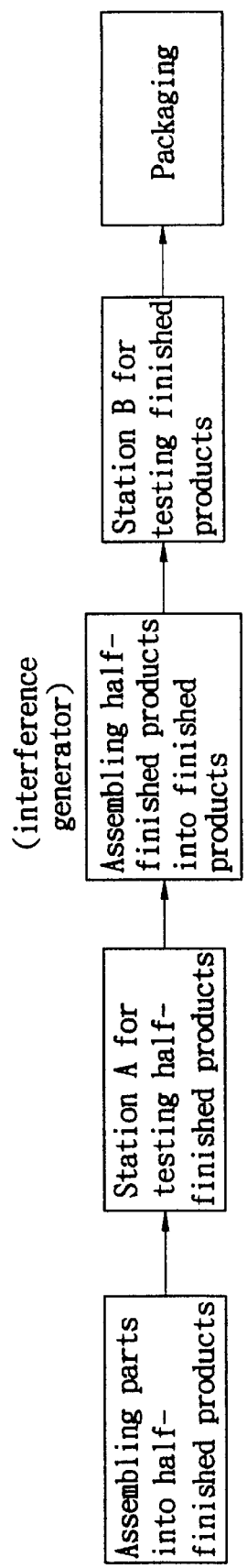
FIG. 4 is a flowchart showing steps of a method for testing micropower short-wave FM digital radio on a production line according to a first embodiment of the present invention.

Please refer to FIG. 4 that is a flowchart showing steps included in the method according to a first embodiment of the present invention. As shown, a production line is provided with a test station A for testing assembled half-finished products and a test station B for testing finished products. A transmitter and a corresponding receiver on the same one tested product are positioned in a steel cage 30 located at the test station. Although the test stations A and B are separated from each other by a certain distance and the steel cages 30 are able to attenuate electric waves radiated therefrom, the two test stations mutually interfere with each other, anyway. Therefore, an interference generator is provided between the two test stations A and B to transmit equifrequent signal-free carrier waves for interfering purpose. In the course of test in each steel cage 30, outward radiated electric waves are first attenuated by the steel cage 30 at the test station and then destructed by the interfering electric waves transmitted from the interference generator. The interfered and destructed electric waves, when being transmitted to another test station, are attenuated again and finally superceded by the electric waves in the steel cage 30 at that test station. The attenuated and signal-free carrier waves are not decoded at the receiver of the tested product at another test station. Thus, tests simultaneously conducted at two adjacent test stations are completely protected from mutual interference with one another.

Figure 5:
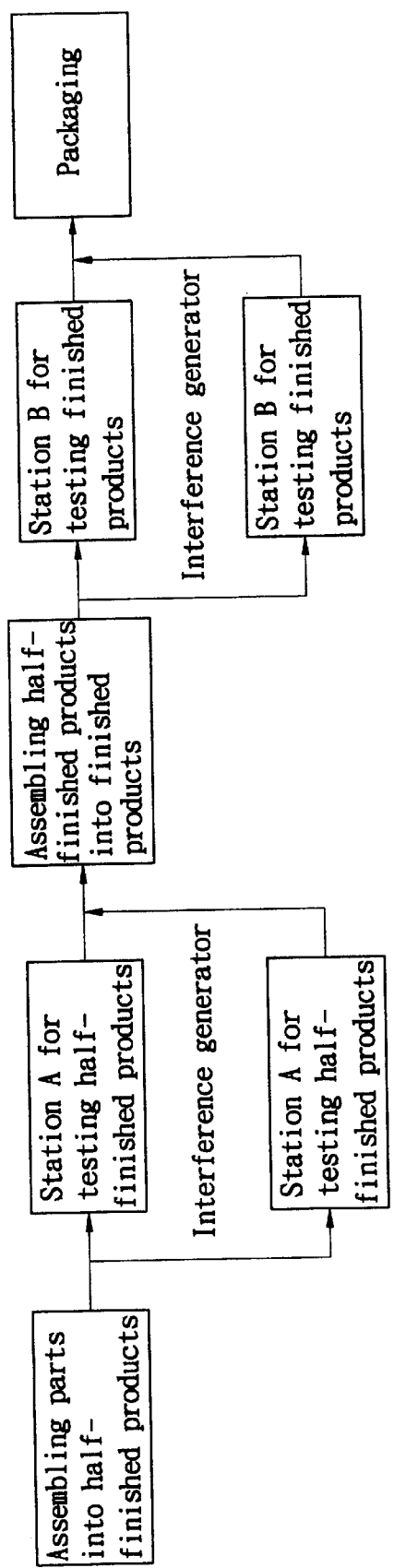
FIG. 5 is a flowchart showing steps of a method for testing micropower short-wave FM digital radio on a production line according to a second embodiment of the present invention.
Figure 6:
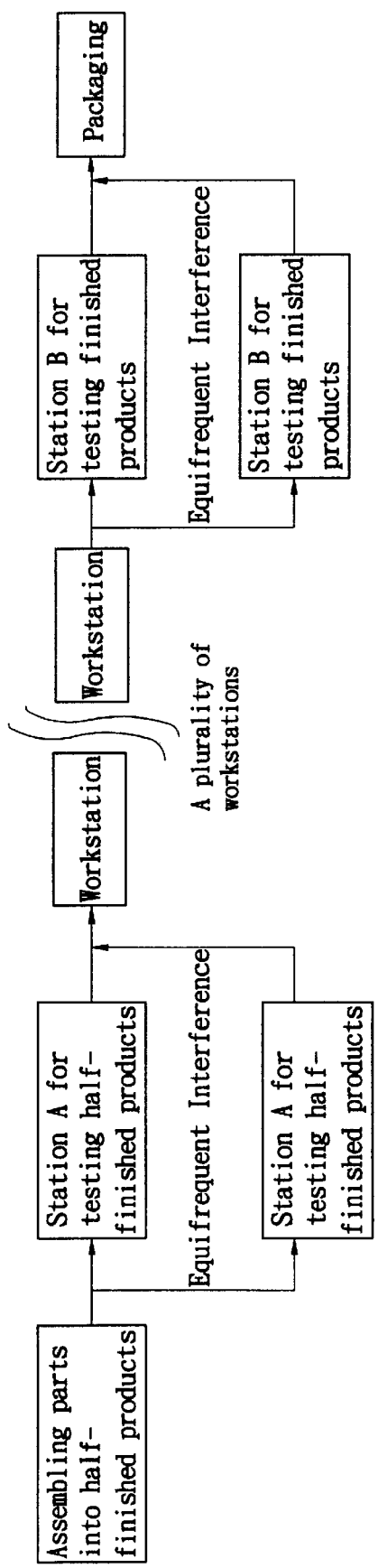
FIG. 6 is a flowchart showing steps of a method for testing micropower short-wave FM digital radio on a production line according to a third embodiment of the present invention.

In the case the tests need to be conducted more quickly or more workstations are provided between the two test stations to obtain an increased productivity on the production line, two or more test stations A and B equipped with the steel cages 30 could be provided, as shown in FIGS. 5 and 6. In this case, an interference generator is provided between two steel cages at two adjacent test stations A or B to fully prevent mutual interference between any two adjacent test stations.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method for testing micropower short-wave frequency-modulation digital radio on a production line, comprising the following steps:
   a. providing on said production line with at least two test stations;
   b. providing on each of said test stations with a steel cage that is adapted to accommodate a transmitter and a corresponding receiver of a product to be tested therein; and
   c. providing between said steel cages located at any two adjacent ones of said at least two test stations with an interference generator that is adapted to transmit signal-free carrier waves having the same frequency as that of signal-carrying carrier waves transmitted from said transmitter of said product to be tested;
   whereby electric waves radiated from said transmitter of said tested product positioned in any one of said steel cages are first attenuated by said steel cage in which said transmitter is positioned, and then destructed due to interference by electric waves transmitted from said interference generator; said interfered and destructed electric waves, when being transmitted to another one of said at least two test stations, being attenuated again by said steel cage located thereat and finally superceded by electric waves in said steel cage at said another test station; and wherein said attenuated signal-free carrier waves are not decoded at a receiver of a tested product in said steel cage at said another test station, enabling tests simultaneously conducted at two adjacent ones of said test stations to be completely protected from mutual interference with one another.

2. The method for testing micropower short-wave frequency-modulation digital radio on a production line as claimed in claim 1, wherein said signal-free carrier waves transmitted from said interference generator have intensity higher than that of said signal-carrying carrier waves transmitted from said transmitters of said tested products to produce destructive interference with said tested transmitters, so that said interfered and destructed carrier waves originated from any of said tested transmitters are not decoded by any of said receivers of said tested products in said steel cages at any of said another test stations.

3. The method for testing micropower short-wave frequency-modulation digital radio on a production line as claimed in claim 1, wherein said signal-carrying carrier waves transmitted from said tested transmitters have intensity higher than that of said equifrequent signal-free carrier waves transmitted from said interference generator, so that said signal-carrying carrier waves in each of said steel cages are not interfered by said equifrequent signal-free carrier waves from said interference generator and could be decoded by said corresponding receiver in the same said steel cage.

4. The method for testing micropower short-wave frequency-modulation digital radio on a production line as claimed in claim 1, wherein said transmitters to be tested transmit digital signals, and said interference generator transmits frequency-modulated signals having frequency the same as that of said digital signals transmitted from said transmitters to be tested, and wherein said frequency-modulated signals have intensity larger than that of said digital signals, preventing digital frequency-modulated signals from being effectively decoded.

5. An apparatus for testing micropower short-wave frequency-modulation digital radio on a production line, comprising at least one interference generator and at least two steel cages;
   said interference generator being composed of a frequency-modulation circuit, a crystal-oscillating and frequency-adjusting circuit, a power-adjusting circuit, a power-output circuit, and a transmission antenna;
   said frequency-modulation circuit modulating a radio frequency into a predetermined range and limiting said crystal oscillating and frequency-adjusting circuit to generate an oscillating frequency within said predetermined range and to adjust and correct said oscillating frequency for the same to fall into a more accurate range of frequency, said power-adjusting circuit adjusting said corrected oscillating frequency to a desired power intensity depending on a distance by which said frequency is to be transmitted; and said power-output circuit transmitting an equifrequent carrier-free signal via said transmitting antenna after said desired power intensity has been obtained through adjustment by said power-adjusting circuit; and
   each of said steel cages being a cage made of steel wires to be capable of attenuating electric signals inside and outside said steel cages.

* * * * *